United States Patent
Yang et al.

(10) Patent No.: US 10,956,903 B2
(45) Date of Patent: Mar. 23, 2021

(54) OBTAINING A BLOCKCHAIN-BASED, REAL-NAME, ELECTRONIC BILL

(71) Applicant: Advanced New Technologies Co., Ltd., Grand Cayman (KY)

(72) Inventors: Zhenyu Yang, Hangzhou (CN); Longsheng Qing, Hangzhou (CN); Ge Jin, Hangzhou (CN); Zhen Sun, Hangzhou (CN); Xueqing Yang, Hangzhou (CN); Zhenzhong Meng, Hangzhou (CN); Yu Chu, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/779,511

(22) Filed: Jan. 31, 2020

(65) Prior Publication Data
US 2020/0175487 A1 Jun. 4, 2020

Related U.S. Application Data

(63) Continuation of application No. PCT/CN2020/071960, filed on Jan. 14, 2020.

(30) Foreign Application Priority Data

Jul. 31, 2019 (CN) .......................... 201910703824.8

(51) Int. Cl.
*G06Q 20/14* (2012.01)
*G06Q 20/10* (2012.01)
(Continued)

(52) U.S. Cl.
CPC ......... *G06Q 20/382* (2013.01); *G06F 16/182* (2019.01); *G06Q 20/102* (2013.01);
(Continued)

(58) Field of Classification Search
CPC .. G06Q 20/00–425; G06Q 2220/00–18; H04L 9/00–38; H04L 2209/00–88
See application file for complete search history.

(56) References Cited

U.S. PATENT DOCUMENTS 5,892,900 A * 4/1999 Ginter .................... G06F 21/10
726/26
2003/0126048 A1 7/2003 Hollar et al.
(Continued)

FOREIGN PATENT DOCUMENTS

CN 106779385 5/2017
CN 106952094 7/2017
(Continued)

OTHER PUBLICATIONS

Antonopoulos et al., Mastering Ethereum, Dec. 2018, O'Reilly Media, Inc., First Edition, pp. 1, 99, 107-108, 111, 124, 253, 256-258 (Year: 2018).*
(Continued)

Primary Examiner — Calvin L Hewitt, II
Assistant Examiner — Chenyuh Kuo
(74) Attorney, Agent, or Firm — Fish & Richardson P.C.

(57) ABSTRACT

A computer-implemented method, non-transitory, computer-readable medium, and computer-implemented system is provided for obtaining a real-name electronic bill. In response to an association operation initiated by a user for a target electronic bill, an association transaction is published that includes an identifier of the target electronic bill, where the association transaction causes a network node on the blockchain to return identity association prompt information when determining that the target electronic bill stored in the blockchain is not associated with user identity information (UII). The UII is collected when receiving the identity association prompt information. The UII is sent to the network node, where the network node verifies whether the
(Continued)

UII matches identity information of a payment user in the target electronic bill, and after verification succeeds, publishes an association relationship between the UII and the identifier of the target electronic bill to the blockchain for storage.

10 Claims, 9 Drawing Sheets

(51) Int. Cl.
*G06Q 20/40* (2012.01)
*G06Q 20/38* (2012.01)
*G06F 16/182* (2019.01)
*H04L 9/06* (2006.01)
*H04L 9/32* (2006.01)

(52) U.S. Cl.
CPC ........... *G06Q 20/14* (2013.01); *G06Q 20/401* (2013.01); *G06Q 20/407* (2013.01); *G06Q 20/4014* (2013.01); *H04L 9/0643* (2013.01); *G06Q 2220/00* (2013.01); *H04L 9/3263* (2013.01); *H04L 2209/38* (2013.01); *H04L 2209/56* (2013.01)

(56) References Cited

U.S. PATENT DOCUMENTS

| | | | |
|---|---|---|---|
| 2004/0088255 | A1 | 5/2004 | Zielke et al. |
| 2008/0040265 | A1* | 2/2008 | Rackley, III ........... G06Q 20/32 705/40 |
| 2010/0030675 | A1 | 2/2010 | Hanan et al. |
| 2013/0138570 | A1* | 5/2013 | Ross ................... H04L 63/0861 705/67 |
| 2015/0161580 | A1* | 6/2015 | Seol ................. G06Q 20/40145 705/18 |
| 2016/0321624 | A1* | 11/2016 | Brunner ................... H04W 4/14 |
| 2017/0004550 | A1 | 1/2017 | Shaaban et al. |
| 2017/0148016 | A1 | 5/2017 | Davis |
| 2017/0236123 | A1 | 8/2017 | Ali et al. |
| 2018/0075536 | A1 | 3/2018 | Jayaram et al. |
| 2019/0066079 | A1 | 2/2019 | Liu et al. |
| 2019/0080284 | A1 | 3/2019 | Kim et al. |
| 2019/0205884 | A1 | 7/2019 | Batra et al. |
| 2019/0222560 | A1 | 7/2019 | Ford et al. |
| 2020/0042960 | A1 | 2/2020 | Cook et al. |
| 2020/0213311 | A1* | 7/2020 | Saha ..................... H04L 9/3236 |

FOREIGN PATENT DOCUMENTS

| | | |
|---|---|---|
| CN | 106952124 | 7/2017 |
| CN | 109034924 | 12/2018 |
| CN | 109165943 | 1/2019 |
| CN | 109165957 | 1/2019 |
| CN | 109191219 | 1/2019 |
| CN | 109191272 | 1/2019 |
| CN | 110046945 | 7/2019 |
| CN | 110060112 | 7/2019 |
| CN | 110070443 | 7/2019 |
| CN | 110471986 | 11/2019 |
| TW | I626558 | 6/2018 |
| WO | WO2018161903 | 9/2018 |

OTHER PUBLICATIONS

Antonopoulos et al., Mastering Ethereum, Dec. 2018, O'Reilly Media Inc., First Edition, pp. 107-108, 124, 256-258) (Year: 2018).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2020/071960, dated Apr. 26, 2020, 14 pages (with partial machine translation).
Zhang et al., "Research of Electronic Invoice System Based on Block Chain," Journal of Information Security Research, Jun. 2017, 3(6):1-7 (with English abstract).
U.S. Appl. No. 16/779,173, filed Jan. 31, 2020, Jin et al.
U.S. Appl. No. 16/779,198, filed Jan. 31, 2020, Sun et al.
U.S. Appl. No. 16/783,075, filed Feb. 5, 2020, Yang et al.
U.S. Appl. No. 16/783,094, filed Feb. 5, 2020, Qing.
U.S. Appl. No. 16/783,098, filed Feb. 5, 2020, Meng et al.

* cited by examiner

OBTAINING A BLOCKCHAIN-BASED, REAL-NAME, ELECTRONIC BILL

CROSS-REFERENCE TO RELATED APPLICATIONS

This application is a continuation of PCT Application No. PCT/CN2020/071960, filed on Jan. 14, 2020, which claims priority to Chinese Patent Application No. 201910703824.8, filed on Jul. 31, 2019, and each application is hereby incorporated by reference in its entirety.

TECHNICAL FIELD

One or more implementations of the present specification relate to the field of blockchain technologies, and in particular, to a blockchain-based real-name bill obtaining method, apparatus, and an electronic device.

BACKGROUND

Blockchain technology, also known as distributed ledger technology, is an emerging technology in which several computing devices participate in "record-keeping" and jointly maintain a complete distributed database. Since blockchain technology has the characteristics of decentralization, openness, transparency, each computing device can participate in database records, and data can be quickly synchronized between computing devices, blockchain technology has been widely used in many fields.

SUMMARY

The present specification provides a blockchain-based real-name bill obtaining method, where the method is applied to a bill management terminal interconnected with a network node on the blockchain, and the blockchain stores an electronic bill; the method includes: publishing, to the blockchain in response to an association operation initiated by a user for a target electronic bill, an association transaction that includes an identifier of the target electronic bill, so in response to the association transaction, the network node on the blockchain returns identity association prompt information to the bill management terminal when determining that the target electronic bill stored in the blockchain is not associated with user identity information; collecting user identity information when receiving the identity association prompt information; and sending the user identity information to the network node on the blockchain, so the network node on the blockchain verifies whether the user identity information matches identity information of a payment user in the target electronic bill, and after verification succeeds, publishes an association relationship between the user identity information and the identifier of the target electronic bill to the blockchain for storage.

Optionally, the method further includes: publishing, to the blockchain in response to a query operation initiated by the user for the target electronic bill, a query transaction that includes the user identity information, so the network node on the blockchain searches for the target electronic bill associated with the user identity information in response to the query transaction, and returns bill information of the target electronic bill to the bill management terminal.

Optionally, the electronic bill stored in the blockchain is encrypted in advance; and the method further includes: querying a decryption key corresponding to the target electronic bill from a key management platform; and decrypting, based on the decryption key, the bill information of the target electronic bill returned by the bill management terminal, and displaying the decrypted bill information of the target electronic bill to the user.

Optionally, the method further includes: invoking, in response to a print operation initiated by the user for the target electronic bill, printing hardware loaded on the bill management terminal, and printing the target electronic bill as a paper bill; and obtaining a bill number of the paper bill, and publishing an association relationship between the bill number of the paper bill and the identifier of the target electronic bill to the blockchain for storage.

Optionally, the sending the user identity information to the network node on the blockchain, so the network node on the blockchain verifies whether the user identity information matches identity information of a payment user in the target electronic bill includes: sending, to the network node on the blockchain, a smart contract invoking transaction that includes the user identity information, so in response to the smart contract invoking transaction, the network node on the blockchain invokes a verification logic declared in a smart contract deployed on the blockchain, to verify whether the user identity information matches the identity information of the payment user in the target electronic bill.

The present specification further provides a blockchain-based real-name bill obtaining method, where the method is applied to a network node on the blockchain, and the method includes: receiving an association transaction sent by a bill management terminal, where the association transaction includes an identifier of a target electronic bill; in response to the association transaction, sending identity association prompt information to the bill management terminal when determining that the target electronic bill is not associated with user identity information, so the bill management terminal collects the user identity information; and receiving the user identity information sent by the bill management terminal, verifying whether the user identity information matches identity information of a payment user in the target electronic bill, and after verification succeeds, publishing an association relationship between the user identity information with the identifier of the target electronic bill to the blockchain for storage.

Optionally, the receiving the user identity information sent by the bill management terminal, and verifying whether the user identity information matches identity information of a payment user in the target electronic bill includes: receiving a smart contract invoking transaction sent by the bill management terminal, where the smart contract invoking transaction includes the user identity information; and in response to the smart contract invoking transaction, invoking a verification logic declared in a smart contract deployed on the blockchain to verify whether the user identity information matches the identity information of the payment user in the target electronic bill.

Optionally, the method further includes: receiving a query transaction sent by the bill management terminal, where the query transaction includes the user identity information; searching for the target electronic bill associated with the user identity information in response to the query transaction; and returning bill information of the target electronic bill to the bill management terminal.

The present specification further provides a blockchain-based real-name bill obtaining apparatus, where the apparatus is applied to a bill management terminal interconnected with a network node on the blockchain, and the blockchain stores an electronic bill; the apparatus includes: a first publishing module, configured to publish, to the blockchain in response to an association operation initiated by a user for a target electronic bill, an association transaction that includes an identifier of the target electronic bill, so in response to the association transaction, the network node on the blockchain returns identity association prompt information to the bill management terminal when determining that the target electronic bill stored in the blockchain is not associated with user identity information; a collection module, configured to collect user identity information when receiving the identity association prompt information; and a second publishing module, configured to send the user identity information to the network node on the blockchain, so the network node on the blockchain verifies whether the user identity information matches identity information of a payment user in the target electronic bill, and after verification succeeds, publishes an association relationship between the user identity information and the identifier of the target electronic bill to the blockchain for storage.

Optionally, the apparatus further includes: a querying module, configured to: publish, to the blockchain in response to a query operation initiated by the user for the target electronic bill, a query transaction that includes the user identity information, so the network node on the blockchain searches for the target electronic bill associated with the user identity information in response to the query transaction, and returns bill information of the target electronic bill to the bill management terminal.

Optionally, the electronic bill stored in the blockchain is encrypted in advance; and the apparatus further includes: a decryption module, configured to query a decryption key corresponding to the target electronic bill from a key management platform; and decrypt, based on the decryption key, the bill information of the target electronic bill returned by the bill management terminal, and display the decrypted bill information of the target electronic bill to the user.

Optionally, the apparatus further includes: a printing module, configured to: invoke, in response to a print operation initiated by the user for the target electronic bill, printing hardware loaded on the bill management terminal, and print the target electronic bill as a paper bill; and obtain a bill number of the paper bill, and publish an association relationship between the bill number of the paper bill and the identifier of the target electronic bill to the blockchain for storage.

Optionally, the second publishing module is configured to send, to the network node on the blockchain, a smart contract invoking transaction that includes the user identity information, so in response to the smart contract invoking transaction, the network node on the blockchain invokes a verification logic declared in a smart contract deployed on the blockchain, to verify whether the user identity information matches the identity information of the payment user in the target electronic bill.

The present specification further provides a blockchain-based real-name bill obtaining apparatus, where the apparatus is applied to a network node on the blockchain, and the apparatus includes: a receiving module, configured to receive an association transaction sent by a bill management terminal, where the association transaction includes an identifier of a target electronic bill; a returning module, configured to: in response to the association transaction, send identity association prompt information to the bill management terminal when determining that the target electronic bill is not associated with user identity information, so the bill management terminal collects the user identity information; and a publishing module, configured to: receive the user identity information sent by the bill management terminal, verify whether the user identity information matches identity information of a payment user in the target electronic bill, and after verification succeeds, publish an association relationship between the user identity information with the identifier of the target electronic bill to the blockchain for storage.

Optionally, the publishing module is configured to receive a smart contract invoking transaction sent by the bill management terminal, where the smart contract invoking transaction includes the user identity information; and in response to the smart contract invoking transaction, invoke a verification logic declared in a smart contract deployed on the blockchain to verify whether the user identity information matches the identity information of the payment user in the target electronic bill.

Optionally, the apparatus further includes: a querying module, configured to receive a query transaction sent by the bill management terminal, where the query transaction includes the user identity information; searching for the target electronic bill associated with the user identity information in response to the query transaction; and return bill information of the target electronic bill to the bill management terminal.

It can be seen from the previous description that, on one hand, the user can associate, by using the bill management terminal, the user's electronic bill stored in the blockchain with the user identity information, to implement real-name obtaining of the electronic bill.

On the other hand, after receiving the user identity information, the network node on the blockchain can verify whether the user identity information matches the identity information of the payment user in the target electronic bill, thereby effectively preventing the electronic bill from being obtained by someone who does not actually own the electronic bill.

DESCRIPTION OF IMPLEMENTATIONS

Figure 1:
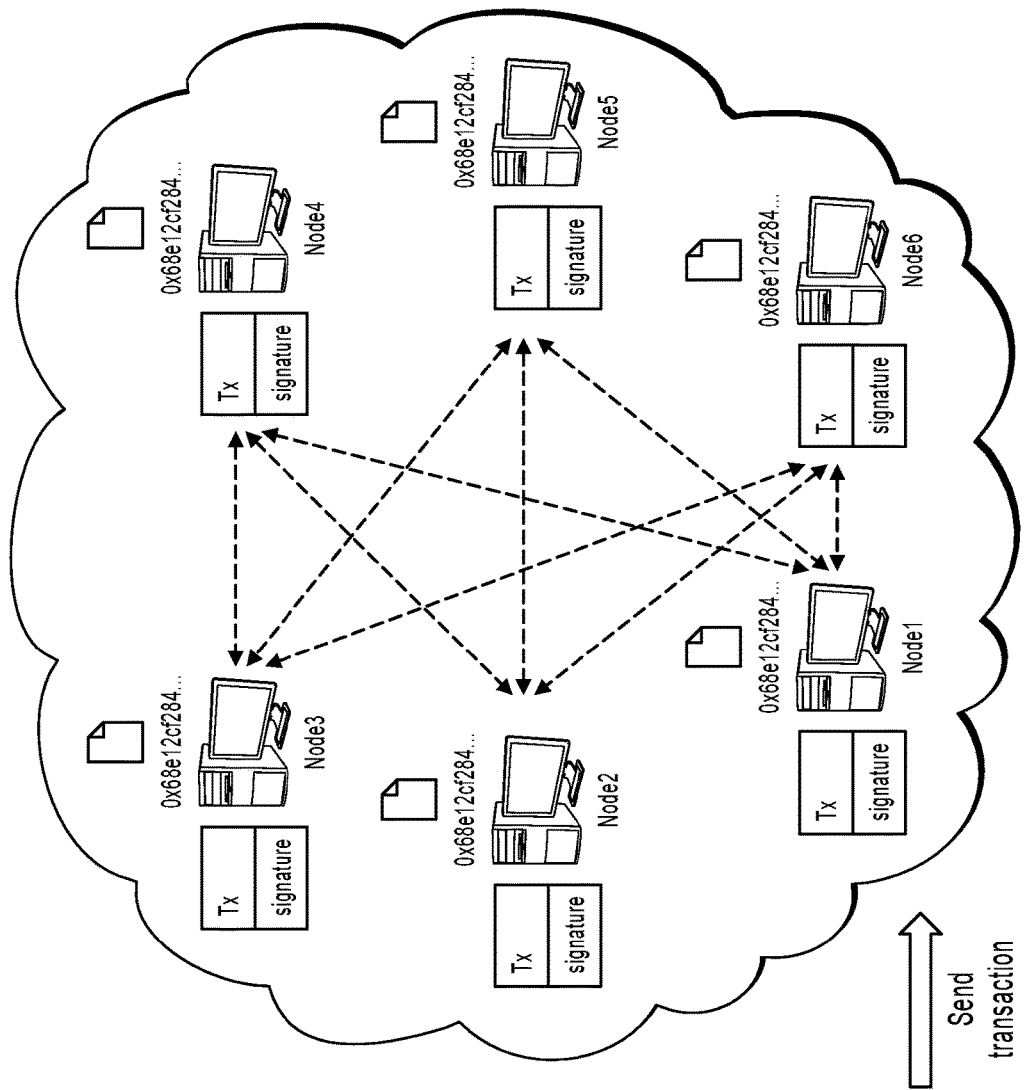
FIG. 1 is a schematic diagram of creating a smart contract, according to an example implementation of the present specification.

Example implementations are described in detail here, and examples of the example implementations are presented in the accompanying drawings. When the following description relates to the accompanying drawings, unless specified otherwise, same numbers in different accompanying drawings represent same or similar elements. Example implementations described in the following do not represent all implementations consistent with the present specification. On the contrary, the implementations are only examples of apparatus and methods that are described in the appended claims in detail and consistent with some aspects of the present specification.

It is worthwhile to note that, in other implementations, steps of a corresponding method are not necessarily performed according to a sequence shown and described in the present specification. In some other implementations, the method can include more or less steps than those described in the present specification. In addition, a single step described in the present specification can be broken down into multiple steps in other implementations for description. However, the multiple steps described in the present specification can also be combined into a single step for description in other implementations.

A blockchain is generally classified into three types: a public blockchain, a private blockchain, and a consortium blockchain. In addition, there are several types of combinations, such as private blockchain+consortium blockchain and consortium blockchain+public blockchain.

The public blockchain has the highest degree of decentralization. The public blockchain is represented by Bitcoin and Ethereum. Participants (also referred to as blockchain nodes) who join the public blockchain can read on-chain data records, participate in transactions, and compete for accounting rights of new blocks. In addition, each node can freely join or exit a network and perform related operations.

On the contrary, a write right of the private blockchain network is controlled by a certain organization or institution, and a data reading right is specified by the organization. In short, the private blockchain can be a weak centralization system, and participating nodes are strictly limited and rare. This type of blockchain is more suitable for internal use within a specific organization.

The consortium blockchain is a blockchain balanced between the public blockchain and the private blockchain, and can be "partially decentralized". Each node in the consortium blockchain usually has a corresponding entity institution or organization. Nodes join the network through authorization and form interest-related consortiums to jointly maintain blockchain operation.

Based on the basic characteristics of the blockchain, the blockchain usually consists of several blocks. Timestamps corresponding to creation moments of these blocks are separately recorded in these blocks, and all the blocks strictly form a time-ordered data chain based on the timestamps recorded in the blocks.

For real data generated in the physical world, the data can be formed into a standard transaction format supported by the blockchain, and then published to the blockchain. Network nodes in the blockchain perform consensus processing on the received transaction. After the consensus is reached, a network node serving as a bookkeeping node in the blockchain seals the transaction into a block and persistently stores the transaction in the blockchain.

Consensus algorithms supported in the blockchain can include: a first-type consensus algorithm where a network node needs to compete for the bookkeeping right in each round of bookkeeping, such as Proof of Work (POW), Proof of Stake (POS), and Delegated Proof of Stake (DPOS); a second-type consensus algorithm where a bookkeeping node is elected in advance for each round of bookkeeping (there is no need to compete for the bookkeeping right), such as a Practical Byzantine Fault Tolerance (PBFT).

In a blockchain network using the first-type consensus algorithm, all network nodes that compete for the bookkeeping right can execute a transaction after receiving the transaction. One of the network nodes that compete for the bookkeeping right can prevail in a current round and become the bookkeeping node. The bookkeeping node can seal a received transaction with other transactions to generate a latest block, and send the generated latest block or a block header of the latest block to other network nodes for reaching consensus.

In a blockchain network using the second-type consensus algorithm, a network node having the bookkeeping right has been agreed upon before the current round of bookkeeping. Therefore, after receiving a transaction, a network node can send the transaction to the bookkeeping node if the network node is not the bookkeeping node of the current round. The bookkeeping node in the current round can execute the transaction when or before sealing the transaction with other transactions to generate a latest block. After generating the latest block, the bookkeeping node can send the latest block or a block header of the latest block to other network nodes for reaching consensus.

As described above, regardless of which consensus algorithm is used in the blockchain, the bookkeeping node in the current round can seal the received transaction to generate the latest block, and send the generated latest block or the block header of the latest block to other network nodes for consensus verification. After receiving the latest block or the block header of the latest block, if the other network nodes verify that the latest block is correct, the other network nodes can append the latest block to the end of the original blockchain, so as to complete a bookkeeping process of the blockchain. In the process of verifying a new block or block header from the bookkeeping node, the other nodes can also execute a transaction included in the block.

In addition, in practice, the smart contract function can be provided for public, private, and consortium blockchains. The smart contract on the blockchain is a contract that can be triggered by a transaction on the blockchain. The smart contract is defined in the form of codes.

Taking Ethereum as an example, users can create and invoke some complex logics in the Ethereum network. An Ethereum virtual machine (EVM) is the core of Ethereum, which is a programmable blockchain, and each Ethereum node can run the EVM. The EVM is a Turing-complete virtual machine, through which various complex logics can be implemented. The user publishes and invokes the smart contract actually on the EVM in the Ethereum. In fact, the EVM directly runs virtual machine codes (virtual machine bytecode, "bytecode" for short), so the smart contract deployed on the blockchain can be bytecodes.

As shown in FIG. 1, after Bob sends a transaction containing information about creating a smart contract to the Ethereum network, each node can execute the transaction in the EVM. The From field of the transaction in FIG. 1 is used to record an address of an account that initiates the creating of the smart contract. Contract codes stored in a field value of the Data field of the transaction can be bytecodes, and a field value of the To field of the transaction is a null account. After a consensus is reached between nodes based on a consensus mechanism, the smart contract is successfully created. Subsequently, a user can invoke the smart contract.

After a smart contract is created, a contract account corresponding to the smart contract appears on the blockchain and has a specific address. For example, "0x68e12cf284 . . . " on each node in FIG. 1 represents the address of the created contract account. A contract code and account storage are stored in the account storage of the contract account. The behavior of the smart contract is controlled by the contract code, and the account storage of the smart contract keeps the contract status. In other words, the smart contract causes a virtual account including the contract codes and account storage to be generated on the blockchain.

As mentioned above, the Data field of the transaction containing information about creating a smart contract can store the bytecodes of the smart contract. The bytecode consists of a series of bytes. Each byte can identify one operation. Based on development efficiency, readability, etc., developers could not write bytecodes directly, but choose high-level languages to write smart contract codes. For example, the high-level languages can be Solidity, Serpent, LLL, etc. For smart contract codes compiled in high-level languages, bytecodes that can be deployed on the blockchain can be generated through compiling by a compiler.

The Solidity language is used as an example. Contract codes compiled by using the Solidity language are similar to the Class in an object-oriented programming language. Multiple members can be declared in a contract, including a status variable, a function, a function modifier, an event, etc. The status variable is a value that is permanently stored in the account storage field of the smart contract and is used to store the status of the contract.

Figure 2:
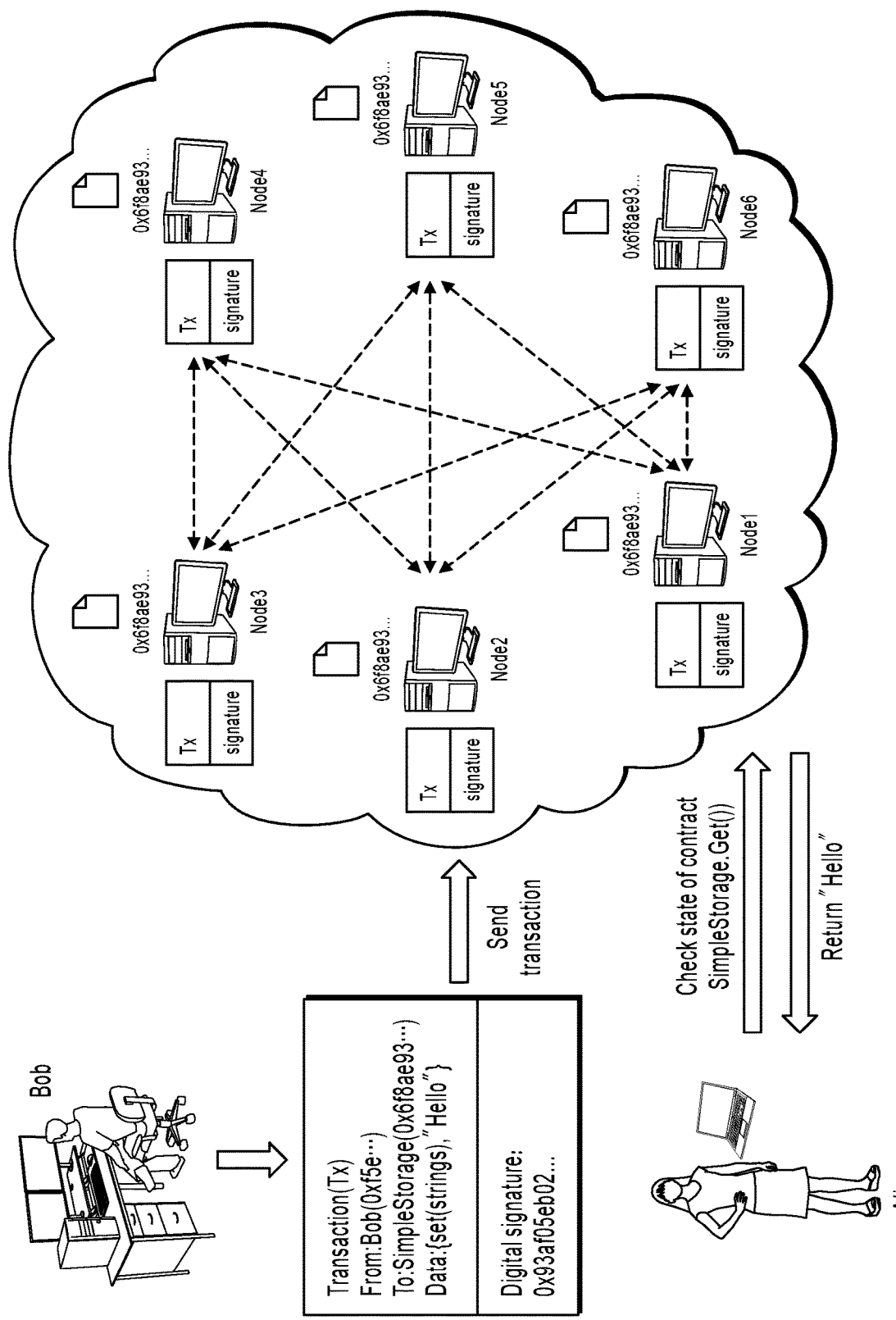
FIG. 2 is a schematic diagram of invoking a smart contract, according to an example implementation of the present specification.

As shown in FIG. 2, Ethereum is still used as an example. After Bob sends a transaction containing information about invoking a smart contract to the Ethereum network, each node can execute the transaction in the EVM. In FIG. 2, the From field of the transaction is used to record an address of an account that initiates the invoking of the smart contract, the To field is used to record an address of the invoked smart contract, and the Data field of the transaction is used to record a method and a parameter for invoking the smart contract. After the smart contract is invoked, the account status of the contract account can change. Subsequently, a certain client can view the account status of the contract account by using an accessed blockchain node (for example, node 1 in FIG. 2).

The smart contract can be executed independently on each node in the blockchain network in a specified method, and all execution records and data are stored in the blockchain. Therefore, after such a transaction is executed, transaction vouchers that cannot be tampered with and will not be lost are stored in the blockchain.

Figure 3:
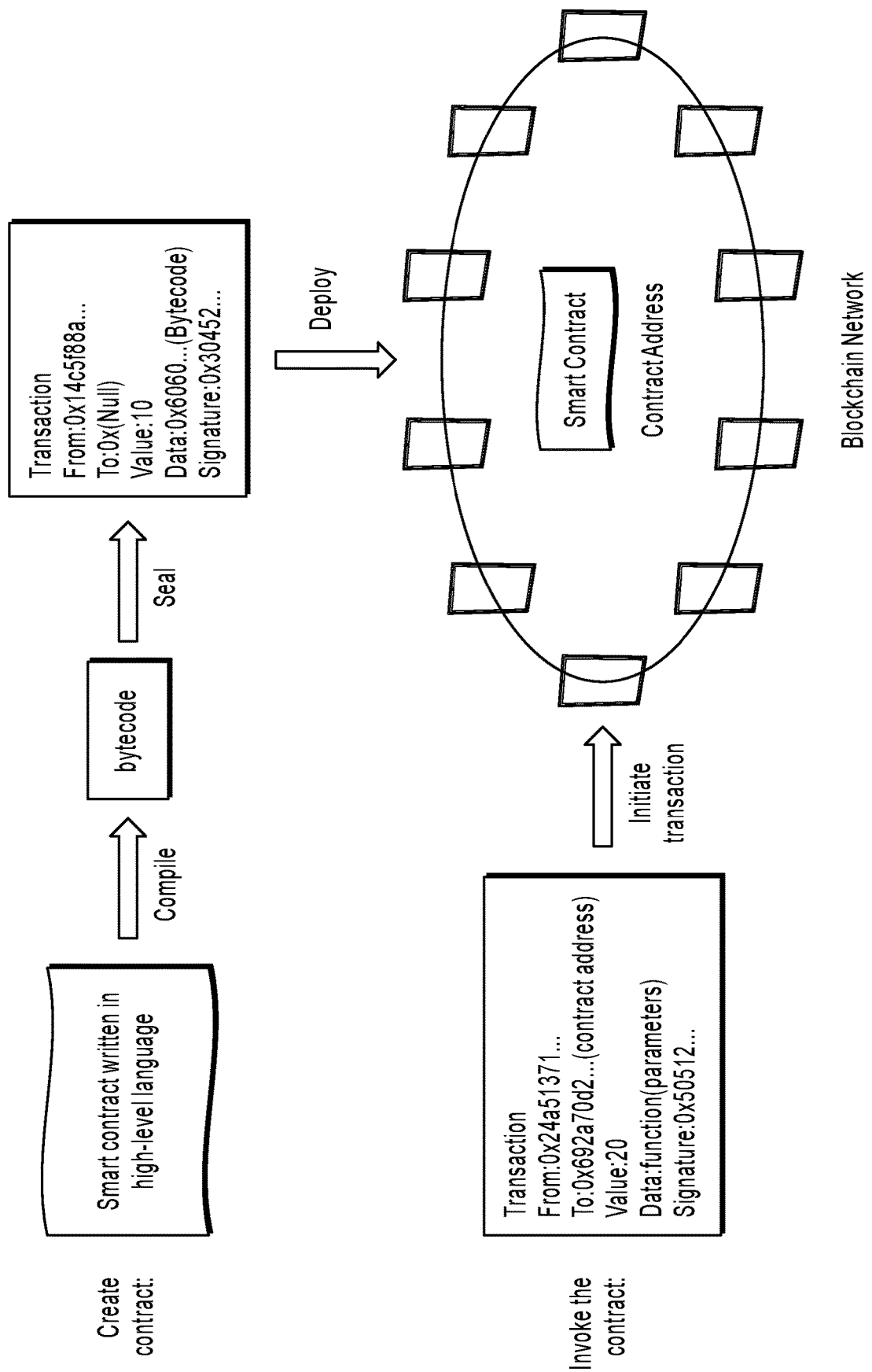
FIG. 3 is a schematic diagram of creating and invoking a smart contract, according to an example implementation of the present specification.

A schematic diagram of creating a smart contract and invoking a smart contract is shown in FIG. 3. Creating a smart contract in Ethereum requires the following processes: compiling the smart contract, changing the smart contract into bytecodes, and deploying the bytecodes to the blockchain. Invoking a smart contract in Ethereum means initiating a transaction pointing to a smart contract address. An EVM of each node can separately execute the transaction, and smart contract codes are distributed on a virtual machine of each node in the Ethereum network.

In addition, in an inter-blockchain scenario, multiple blockchains can be interconnected by using inter-blockchain relays.

The inter-blockchain relay can separately interconnect with multiple blockchains by using bridging interfaces, and implement inter-blockchain data synchronization between the multiple blockchains based on an implemented data transport logic.

An inter-blockchain technology used to implement the previous inter-blockchain relay is not specifically limited in the present specification. For example, in practice, multiple blockchains can be connected by using an inter-blockchain mechanism such as a sidechain technology or a notary technology.

After multiple blockchains are interconnected by using inter-blockchain relays, data on other blockchains can be read and authenticated between the blockchains, or smart contracts deployed on other blockchains can be invoked by using inter-blockchain relays.

In addition to using data stored in the blockchain, the smart contract deployed on the blockchain can also use the Oracle machine to reference data on a data entity off the chain, so as to implement data exchange between the smart contract and the real-world data entity. The off-chain data entity can include a centralized server or data center deployed off the chain, etc.

Different from inter-blockchain relays, the Oracle machine does not synchronize data on one blockchain to another blockchain, but synchronizes data on an off-chain data entity to the blockchain.

That is, the inter-blockchain relay is used to connect two blockchains, and the Oracle machine is used to connect a blockchain with an off-chain data entity to implement data exchange between the blockchain and the real world.

As service scenarios of the blockchain become increasingly rich, in addition to services related to value transfer, such as transfer, more and more blockchain projects begin to introduce traditional service scenarios that are not related to value transfer. For example, a service system can be interconnected with a service blockchain to implement traditional service scenarios such as issuance and reimbursement of electronic bills on the service blockchain.

In the existing field of electronic bill querying, a user usually queries an electronic bill based on an identifier of the electronic bill (such as a code and a number of the electronic bill). However, on one hand, the identifier of the electronic bill has lots of numbers, which are not easy for the user to record. On the other hand, the user needs to enter the identifier of each electronic bill to find the electronic bill. Therefore, using the identifier of the electronic bill to query the electronic bill brings inconvenience to the user, and reduces the efficiency of querying the electronic bill.

The present specification is intended to provide a blockchain-based real-name bill obtaining method. An association relationship between user identity information and an electronic bill of a user is stored in a blockchain, so the user can subsequently find an electronic bill owned by the user by using the user identity information.

During implementation, a bill management terminal publishes, to the blockchain in response to an association operation initiated by a user for a target electronic bill, an association transaction that includes an identifier of the target electronic bill. In response to the association transaction, a network node on the blockchain returns identity association prompt information to the bill management terminal when determining that the target electronic bill stored in the blockchain is not associated with user identity information.

The bill management terminal collects user identity information when receiving the identity association prompt information; and sends the user identity information to the network node on the blockchain, so the network node on the blockchain verifies whether the user identity information matches identity information of a payment user in the target electronic bill, and after verification succeeds, publishes an association relationship between the user identity information and the identifier of the target electronic bill to the blockchain for storage.

It can be seen from the previous description that, the user can associate, by using the bill management terminal, the user's electronic bill stored in the blockchain with the user identity information, to implement real-name obtaining of the electronic bill.

In addition, in a subsequent electronic bill querying process, the user can query the user's electronic bill from the blockchain based on the user identity information, which facilitates querying of the electronic bill.

Figure 4:
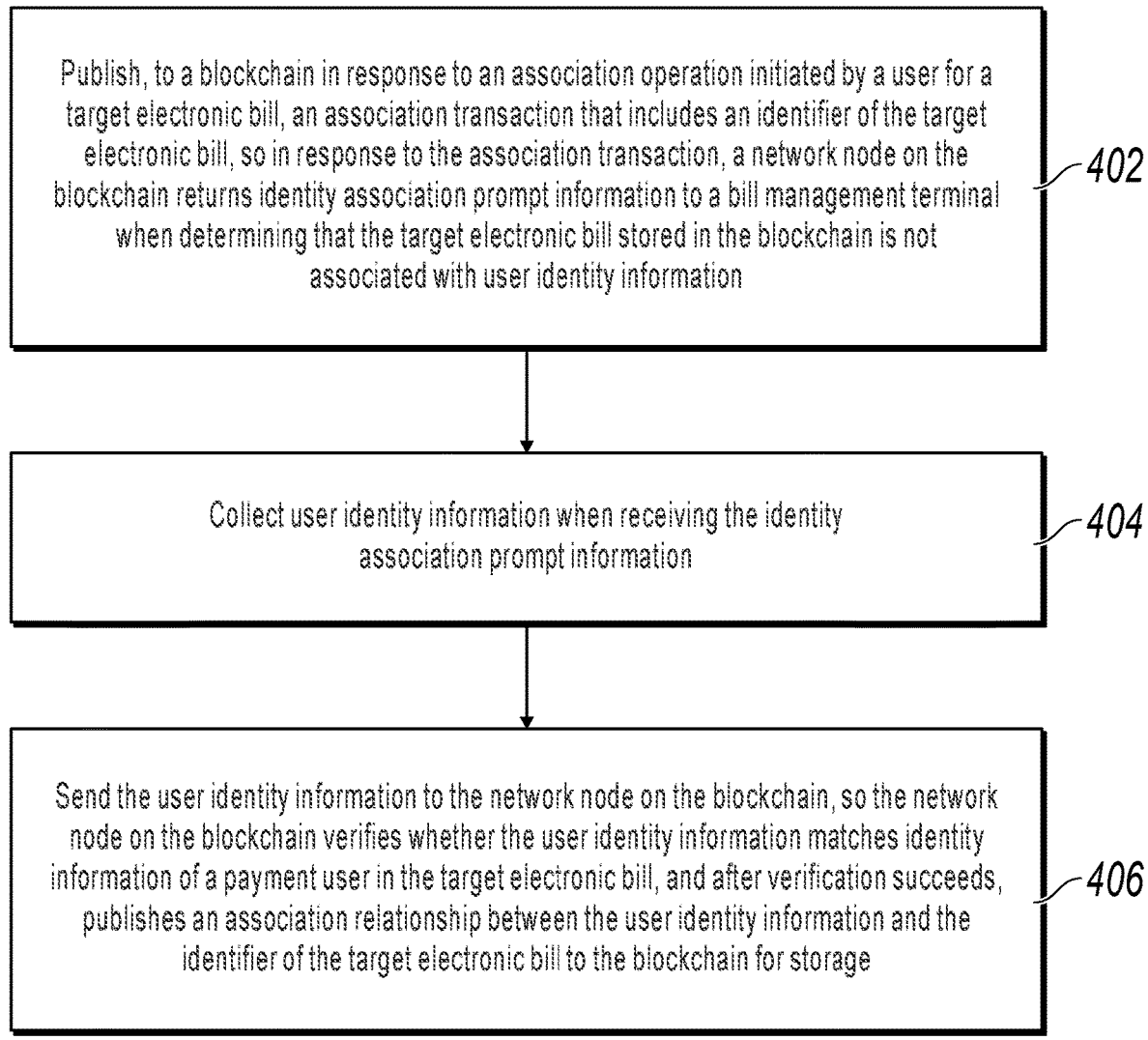
FIG. 4 is a flowchart illustrating a blockchain-based real-name bill obtaining method, according to an example implementation of the present specification.

Referring to FIG. 4, FIG. 4 is a flowchart illustrating a blockchain-based real-name bill obtaining method, according to an example implementation of the present specification. The method can be applied to a bill management terminal, and can include the following steps.

Step 402: Publish, to the blockchain in response to an association operation initiated by a user for a target electronic bill, an association transaction that includes an identifier of the target electronic bill, so in response to the association transaction, a network node on the blockchain returns identity association prompt information to the bill management terminal when determining that the target electronic bill stored in the blockchain is not associated with user identity information.

Step 404: Collect user identity information when receiving the identity association prompt information.

Step 406: Send the user identity information to the network node on the blockchain, so the network node on the blockchain verifies whether the user identity information matches identity information of a payment user in the target electronic bill, and after verification succeeds, publishes an association relationship between the user identity information and the identifier of the target electronic bill to the blockchain for storage.

Figure 5:
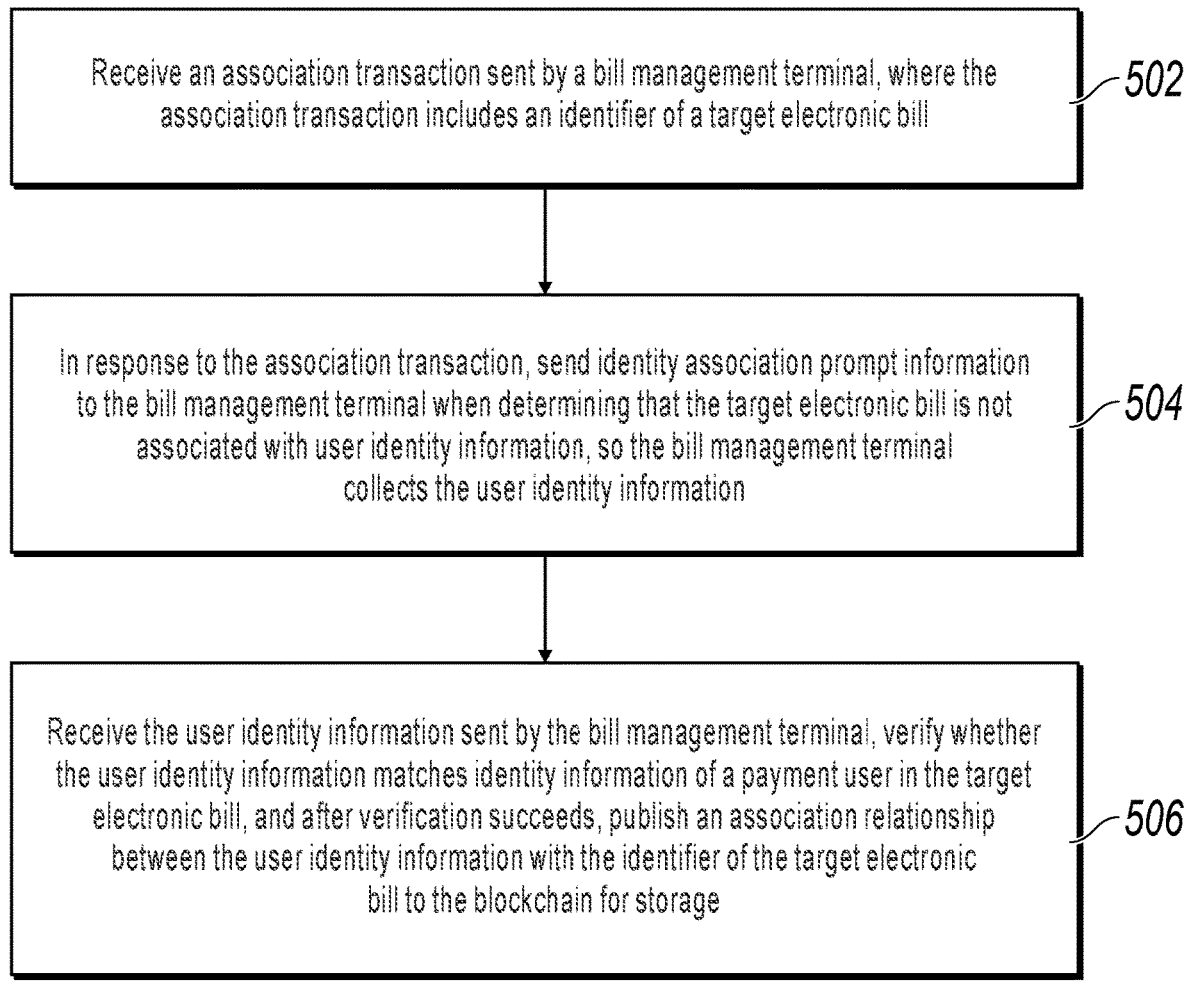
FIG. 5 is a flowchart illustrating a blockchain-based real-name bill obtaining method, according to an example implementation of the present specification.

Referring to FIG. 5, FIG. 5 is a flowchart illustrating a blockchain-based real-name bill obtaining method, according to an example implementation of the present specification. The method can be applied to a network node on the blockchain, and can include the following steps.

Step 502: Receive an association transaction sent by a bill management terminal, where the association transaction includes an identifier of a target electronic bill.

Step 504: In response to the association transaction, send identity association prompt information to the bill management terminal when determining that the target electronic bill is not associated with user identity information, so the bill management terminal collects the user identity information.

Step 506: Receive the user identity information sent by the bill management terminal, verify whether the user identity information matches identity information of a payment user in the target electronic bill, and after verification succeeds, publish an association relationship between the user identity information with the identifier of the target electronic bill to the blockchain for storage.

The previous bill management terminal refers to a terminal device that has a bill management function. The user can use the bill management terminal to obtain electronic bills using the real name, query electronic bills, and print electronic bills.

For example, in the medical field, the bill management terminal can be a management device that is deployed by a medical institution and that has a medical invoice management function. The bill management terminal and its functions are merely described here by way of example, and are not specifically limited.

The above electronic bill identifier refers to information that uniquely identifies an electronic bill.

For example, when the previous electronic bill is an invoice, the electronic bill identifier can be an invoice code, an invoice number, or a combination of an invoice code and an invoice number.

The previous user information can include a name of the user, an identity card number of the user, physiological characteristic information of the user, etc. The physiological characteristic information of the user can include: face characteristic information of the user, fingerprint characteristic information of the user, iris characteristic information of the user, etc. The user information and the physiological characteristic information of the user are merely described here by way of example, and are not specifically limited.

In addition, the blockchain disclosed in this description can be one or a combination of a public blockchain, a private blockchain, and a consortium blockchain. The blockchain disclosed in this description is merely described by way of example, and is not specifically limited. Electronic bills are stored in the blockchain disclosed in the present specification.

The following describes in detail the blockchain-based real-name bill obtaining method from real-name obtaining of the electronic bill and querying of the electronic bill.

1) Real-Name Obtaining of Electronic Bill

A user can initiate an association operation for a target electronic bill by using a bill management terminal.

For example, the interface of the bill management terminal is deployed with an "association option" and a bill identifier entry bar of an electronic bill that the user needs to associate with. The user can enter the identifier of the target electronic bill in the entry bar, and then trigger the "association option". As such, the user can initiate an association operation for the target electronic bill by using the bill management terminal.

Certainly, "the user can initiate an association operation for the target electronic bill by using the bill management terminal" is merely described here by way of example and is not specifically limited.

When detecting the association operation performed by the user for the target electronic bill, the bill management terminal can publish, to a network node on the blockchain in response to the association operation initiated by the user for the target electronic bill, an association transaction that includes the identifier of the target electronic bill. The association transaction includes the identifier of the target electronic bill.

When receiving the association transaction, the network node on the blockchain can search for the target electronic bill in response to the association transaction based on the identifier of the target electronic bill included in the association transaction. Then, the network node on the blockchain can further detect whether the found target electronic bill is associated with user identity information.

If the target electronic bill is associated with user identity information, the network node on the blockchain returns prompt information indicating that the target electronic bill is associated with user identity information to the bill management terminal, so the bill management terminal displays the prompt information indicating that the target electronic bill is associated with user identity information to the user.

If the target electronic bill is not associated with user identity information, the network node on the blockchain returns identity association prompt information to the bill management terminal.

When receiving the identity association prompt information returned by the network node on the blockchain, the bill management terminal can collect the user identity information. For example, the bill management terminal can collect an identity card number of the user, facial feature information, fingerprint information, voiceprint information, and iris information of the user.

For example, during collection, the bill management terminal can display, on the interface of the terminal, prompt information used to prompt the user to enter identity information. After seeing the prompt information, the user can enter the identity number of the user on the bill management terminal. The bill management terminal can obtain the identity number entered by the user, so as to collect the identity information of the user. Certainly, the bill management terminal can further invoke identity card scanning hardware deployed in the terminal to obtain the identity card number of the user by scanning the identity card of the user.

For another example, the bill management terminal can further invoke image collection hardware (such as a camera) deployed on the terminal to collect a face image of the user, and extract face feature information of the user.

For another example, the bill management terminal can further invoke audio collection hardware (such as a microphone) deployed on the terminal to collect sound information of the user. The bill management terminal can further invoke fingerprint collection hardware to collect fingerprint information of the user. The bill management terminal can further invoke iris collection hardware to collect iris information of the user, etc. This is merely described by way of example, and is not specifically limited.

In the implementation of the present specification, after collecting the user identity information, the bill management terminal can send the user identity information to the network node on the blockchain.

To prevent the electronic bill from being obtained by someone who does not actually own the electronic bill, after receiving the user identity information, the network node on the blockchain can check whether the user identity information matches identity information of a payment user in the target electronic bill.

In an optional method, the network node on the blockchain can locally check whether the user identity information matches the identity information of the payer in the target electronic bill.

In another optional method, a smart contract is deployed on the blockchain, and the smart contract includes a verification logic. The verification logic is used to verify whether the user identity information matches the identity information of the payment user in the target electronic bill. The method for creating the smart contract can be shown in FIG. 1, and details are omitted here for simplicity.

In actual application, the bill management terminal can send, to the network node on the blockchain, a smart contract invoking transaction that includes the user identity information. In response to the smart contract invoking transaction, the network node on the blockchain can invoke the verification logic declared in the smart contract deployed on the blockchain to verify whether the user identity information matches the identity information of the payment user in the target electronic bill.

For example, the identity information of the payment user in the electronic bill usually includes the payer name etc.

The collected user information usually includes a unique identity of the user, for example, the identity card number of the user and the physiological characteristic information of the user.

"Verify whether the user identity information matches the identity information of the payment user in the target electronic bill" is described by using an example that the collected user information is the identity card number of the user and the payer identity information of the electronic bill is the payer name.

When verifying whether the user identity information matches the identity information of the payment user in the target electronic bill, the network node on the blockchain can first obtain a user name associated with the identity card number of the user, and then verify whether the user name associated with the identity card number of the user matches the name of the payer in the electronic bill.

The user name associated with the identity card number of the user can be obtained in the following methods.

Method 1: The previous blockchain stores a correspondence between identity card numbers of users and user names.

The network node on the blockchain can search the correspondence, stored in the blockchain, between identity card numbers of users and user names for a user name corresponding to a collected identity card number of a user.

Method 2: An off-chain server stores a correspondence between identity card numbers of users and user names.

The network node on the blockchain can obtain, by using the Oracle machine, the user name corresponding to the collected identity card number of the user from the off-chain server.

Certainly, in the present specification, another blockchain other than the previous blockchain can be separately deployed, and a correspondence between identity card numbers of users and user names is stored in the another blockchain.

The network node on the blockchain can obtain, by using an inter-blockchain relay, the user name corresponding to the collected identity card number of the user from the another blockchain.

Obtaining the user name associated with the identity card number of the user is described by way of example, and is not specifically limited.

In the present specification, when the network node on the blockchain determines that the collected user identity information matches the identity information of the payment user in the target electronic bill, the network node on the blockchain can publish an association relationship between the collected user identity information and the identifier of the target electronic bill to the blockchain for storage.

It can be seen from the previous description that, on one hand, the user can associate, by using the bill management terminal, the user's electronic bill stored in the blockchain with the user identity information, to implement real-name obtaining of the electronic bill.

On the other hand, after receiving the user identity information, the network node on the blockchain can verify whether the user identity information matches the identity information of the payment user in the target electronic bill, thereby effectively preventing the electronic bill from being obtained by someone who does not actually own the electronic bill.

2) Querying of Electronic Bill

After an electronic bill is obtained by using a real name, an association relationship between an identifier of the electronic bill and user identity information is stored in a blockchain.

A user can query the user's own electronic bill based on user identity information.

During implementation, the user can initiate a query operation for a target electronic bill by using a bill management terminal.

For example, the user can enter the user identity information on a query interface of the bill management terminal, so as to initiate a query operation for the target electronic bill.

After detecting the query operation performed by the user for the target electronic bill, the bill management terminal can publish a query transaction to the blockchain. The query transaction includes the user identity information.

In response to the query transaction, the network node on the blockchain can search a correspondence, stored in the blockchain, between user identity information and electronic bill identifiers, the identifier of the target electronic bill corresponding to the user identity information included in the query transaction. Then, the network node on the blockchain returns bill information of the target electronic bill indicated by the electronic bill identifier to the bill management terminal.

In addition, to ensure the security of the user's electronic bill, the electronic bill stored in the blockchain is usually encrypted.

A decryption key of the electronic bill can be stored on a key management platform interconnected with the bill management device.

The bill management terminal can obtain the decryption key corresponding to the target electronic bill from the key management platform, then decrypt, by using the decryption key, the bill information of the target electronic bill returned by the network node on the blockchain, and display the decrypted bill information of the target electronic bill to the user.

It can be seen from the previous description that, instead of querying each electronic bill owned by the user by using an identifier of the electronic bill, the user can query all electronic bills owned by the user by using the user identity information, thereby effectively improving efficiency of querying the electronic bills owned by the user.

In addition, in the implementation of the present specification, the user can print the queried target electronic bill by using the bill management terminal.

To prevent the user from performing multiple repeated reimbursements by using the paper bill and the electronic bill, the bill management terminal can further publish an association relationship between a bill number of the paper bill printed by the user and the identifier of the target electronic bill to the blockchain for storage.

During specific implementation, the user can initiate a print operation for the target electronic bill by using the bill management terminal.

For example, the bill management terminal has a "print" option on the interface for displaying the bill information of the target electronic bill to the user. The user can click the "print" option to initiate a print operation for the target electronic bill.

In response to the print operation initiated by the user for the target electronic bill, the bill management terminal can invoke print hardware loaded on the bill management terminal to print the target electronic bill as a paper bill.

Then, the bill management terminal can obtain the bill number of the paper bill. During obtaining, the bill management terminal can invoke scanning hardware loaded on the bill management terminal to scan the paper bill to obtain the bill number of the paper bill. Certainly, the user can further enter the bill number of the paper bill on the bill management terminal, and the bill management terminal can obtain the bill number of the paper bill that is entered by the user.

After obtaining the bill number of the paper bill, the bill management terminal can publish an association relationship between the bill number of the paper bill and the identifier of the target electronic bill to the blockchain for storage.

It can be seen from the previous description that, on one hand, the user can associate, by using the bill management terminal, the user's electronic bill stored in the blockchain with the user identity information, to implement real-name obtaining of the electronic bill.

On the other hand, after receiving the user identity information, the network node on the blockchain can verify whether the user identity information matches the identity information of the payment user in the target electronic bill, thereby effectively preventing the electronic bill from being obtained by someone who does not actually own the electronic bill.

Furthermore, after the user prints the queried target electronic bill into a paper bill, the bill number of the paper bill and the identifier of the target electronic bill can be published to the blockchain for storage, so as to prevent the user from performing multiple repeated reimbursements.

Figure 6:
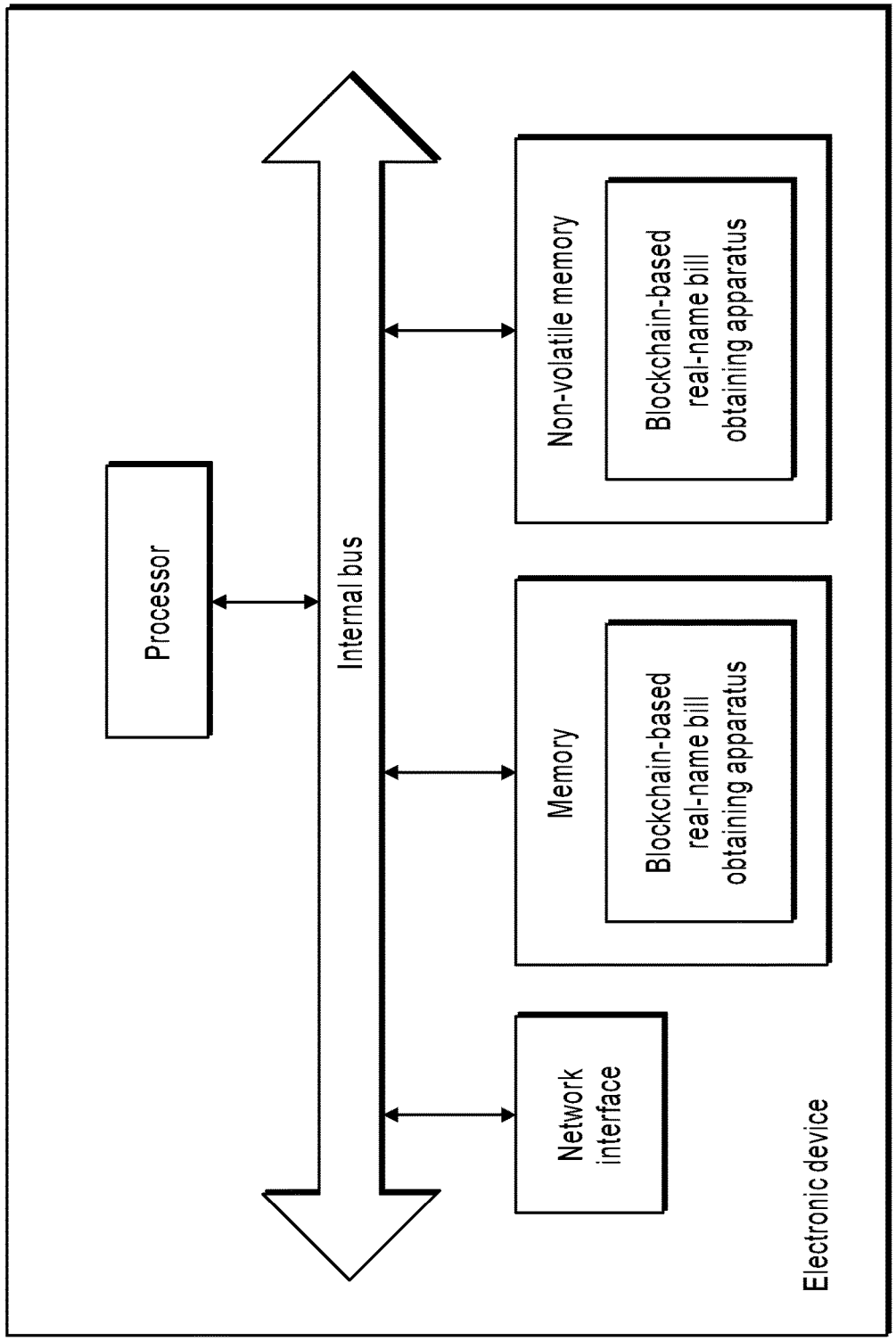
FIG. 6 is a structural hardware diagram illustrating an electronic device, according to an example implementation of the present specification.

Corresponding to the previous method implementation of FIG. 4, the present specification further provides an implementation of a blockchain-based real-name bill obtaining apparatus. The implementation of the blockchain-based real-name bill obtaining apparatus in the present specification can be applied to an electronic device. The apparatus implementation can be implemented by software, hardware, or a combination of hardware and software. Software implementation is used as an example. As a logical device, the device is formed by reading a corresponding computer program instruction in a non-volatile memory to a memory by a processor of an electronic device where the device is located. In terms of hardware, referring to FIG. 6, FIG. 6 is a structural hardware diagram illustrating an electronic device that the blockchain-based real-name bill obtaining apparatus is located in the present specification. In addition to a processor, a memory, a network interface, and a non-volatile memory shown in FIG. 6, the electronic device that the apparatus is located in the implementations can usually include other hardware based on an actual function of the electronic device. Details are omitted here for simplicity.

Figure 7:
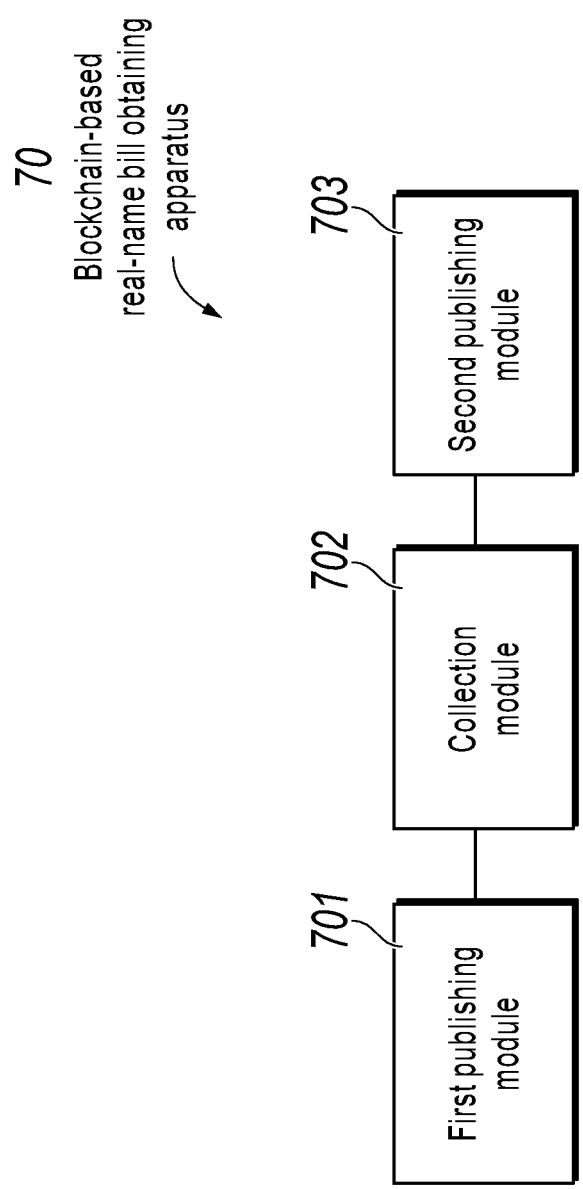
FIG. 7 is a block diagram illustrating a blockchain-based real-name bill obtaining apparatus, according to an example implementation of the present specification.

Referring to FIG. 7, FIG. 7 is a block diagram illustrating a blockchain-based real-name bill obtaining apparatus, according to an example implementation of the present specification. The apparatus is applied to a bill management terminal interconnected with a network node on the blockchain, and the blockchain stores an electronic bill; the apparatus includes: a first publishing module 701, configured to publish, to the blockchain in response to an association operation initiated by a user for a target electronic bill, an association transaction that includes an identifier of the target electronic bill, so in response to the association transaction, the network node on the blockchain returns identity association prompt information to the bill management terminal when determining that the target electronic bill stored in the blockchain is not associated with user identity information; a collection module 702, configured to collect user identity information when receiving the identity association prompt information; and a second publishing module 703, configured to send the user identity information to the network node on the blockchain, so the network node on the blockchain verifies whether the user identity information matches identity information of a payment user in the target electronic bill, and after verification succeeds, publishes an association relationship between the user identity information and the identifier of the target electronic bill to the blockchain for storage.

Optionally, the apparatus further includes: a querying module 704 (not shown in FIG. 7), configured to: publish, to the blockchain in response to a query operation initiated by the user for the target electronic bill, a query transaction that includes the user identity information, so the network node on the blockchain searches for the target electronic bill associated with the user identity information in response to the query transaction, and returns bill information of the target electronic bill to the bill management terminal.

Optionally, the electronic bill stored in the blockchain is encrypted in advance; and the apparatus further includes: a decryption module 705 (not shown in FIG. 7), configured to query a decryption key corresponding to the target electronic bill from a key management platform; and decrypt, based on the decryption key, the bill information of the target electronic bill returned by the bill management terminal, and display the decrypted bill information of the target electronic bill to the user.

Optionally, the apparatus further includes: a printing module 706 (not shown in FIG. 7), configured to: invoke, in response to a print operation initiated by the user for the target electronic bill, printing hardware loaded on the bill management terminal, and print the target electronic bill as a paper bill; and obtain a bill number of the paper bill, and publish an association relationship between the bill number of the paper bill and the identifier of the target electronic bill to the blockchain for storage.

Optionally, the second publishing module 703 is configured to send, to the network node on the blockchain, a smart contract invoking transaction that includes the user identity information, so in response to the smart contract invoking transaction, the network node on the blockchain invokes a verification logic declared in a smart contract deployed on the blockchain, to verify whether the user identity information matches the identity information of the payment user in the target electronic bill.

Figure 8:
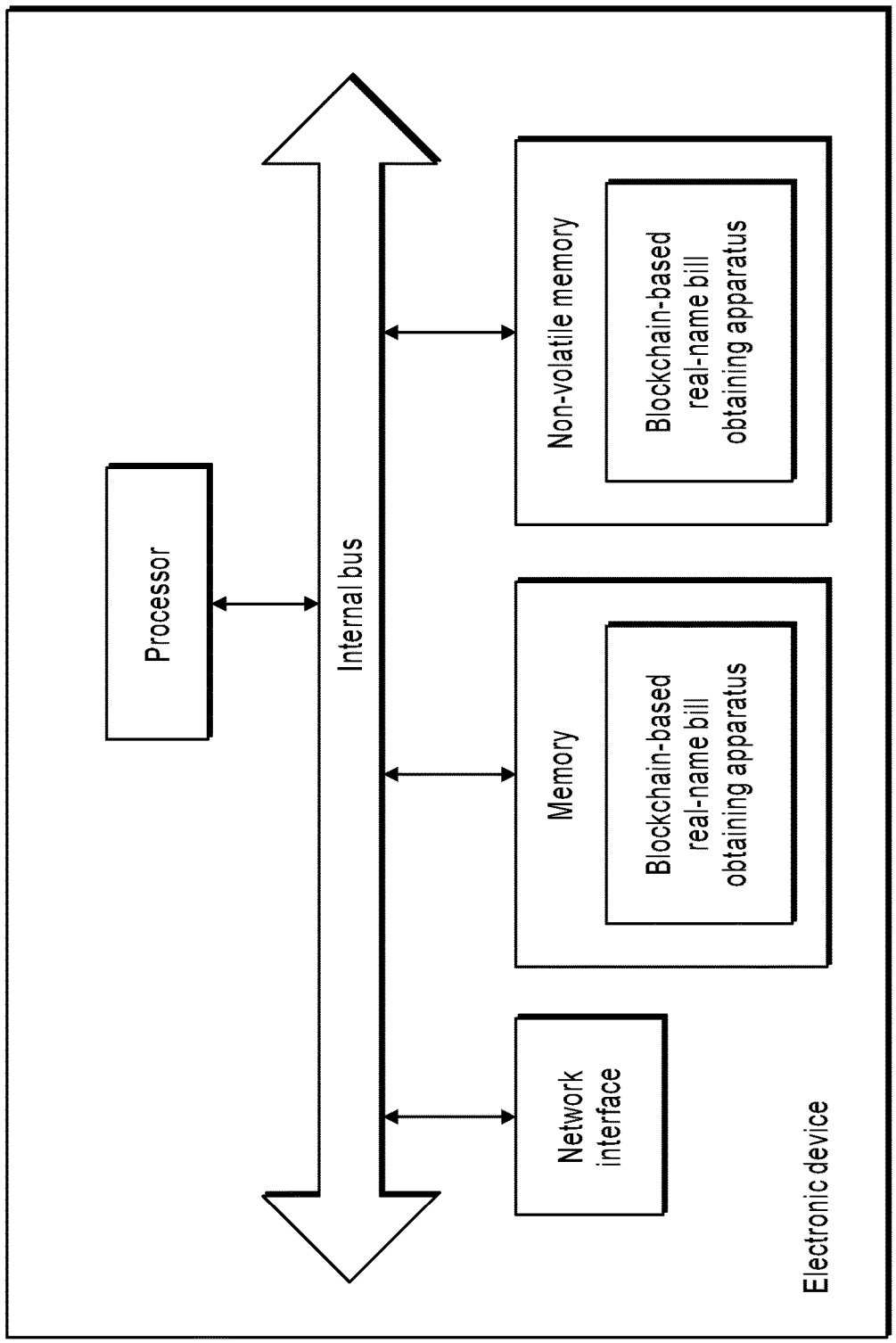
FIG. 8 is a structural hardware diagram illustrating an electronic device, according to an example implementation of the present specification.

Corresponding to the previous method implementation of FIG. 5, the present specification further provides an implementation of a blockchain-based real-name bill obtaining apparatus. The implementation of the blockchain-based real-name bill obtaining apparatus in the present specification can be applied to an electronic device. The apparatus implementation can be implemented by software, hardware, or a combination of hardware and software. Software implementation is used as an example. As a logical device, the device is formed by reading a corresponding computer program instruction in a non-volatile memory to a memory by a processor of an electronic device where the device is located. In terms of hardware, referring to FIG. 8, FIG. 8 is a structural hardware diagram illustrating an electronic device that the blockchain-based real-name bill obtaining apparatus is located in the present specification. In addition to a processor, a memory, a network interface, and a non-volatile memory shown in FIG. 8, the electronic device that the apparatus is located in the implementations can usually include other hardware based on an actual function of the electronic device. Details are omitted here for simplicity.

Figure 9:
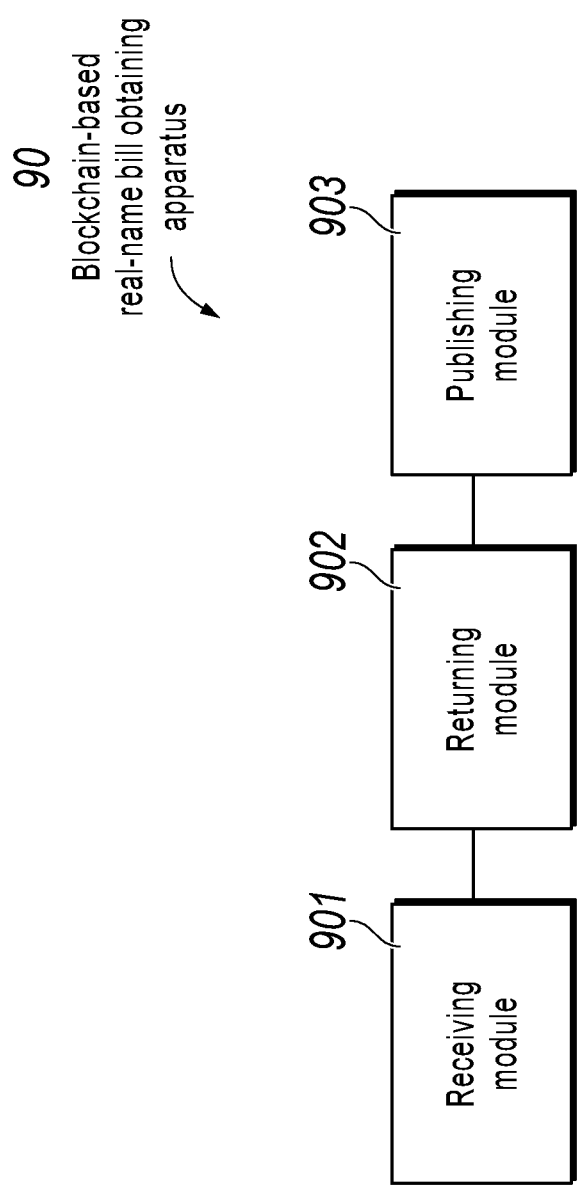
FIG. 9 is a block diagram illustrating another blockchain-based real-name bill obtaining apparatus, according to an example implementation of the present specification.

Referring to FIG. 9, FIG. 9 is a block diagram illustrating another blockchain-based real-name bill obtaining apparatus, according to an example implementation of the present specification. The apparatus is applied to a network node on the blockchain, and the apparatus includes: a receiving module 901, configured to receive an association transaction sent by a bill management terminal, where the association transaction includes an identifier of a target electronic bill; a returning module 902, configured to: in response to the association transaction, send identity association prompt information to the bill management terminal when determining that the target electronic bill is not associated with user identity information, so the bill management terminal collects the user identity information; and a publishing module 903, configured to: receive the user identity information sent by the bill management terminal, verify whether the user identity information matches identity information of a payment user in the target electronic bill, and after verification succeeds, publish an association relationship between the user identity information with the identifier of the target electronic bill to the blockchain for storage.

Optionally, the publishing module 903 is configured to receive a smart contract invoking transaction sent by the bill management terminal, where the smart contract invoking transaction includes the user identity information; and in response to the smart contract invoking transaction, invoke a verification logic declared in a smart contract deployed on the blockchain to verify whether the user identity information matches the identity information of the payment user in the target electronic bill.

Optionally, the apparatus further includes: a querying module 904 (not shown in FIG. 9), configured to receive a query transaction sent by the bill management terminal, where the query transaction includes the user identity information; searching for the target electronic bill associated with the user identity information in response to the query transaction; and return bill information of the target electronic bill to the bill management terminal.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, the computer includes one or more processors (CPU), input/output interfaces, network interfaces, and memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD) or another optical storage, a cassette tape, a magnetic disk storage, a quantum memory, a storage medium based on grapheme, another magnetic storage device, or any other non-transmission medium. The computer storage medium can be used to store information that can be accessed by the computing device. Based on the definition in the present specification, the computer readable medium does not include transitory computer readable media (transitory media) such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

Terms used in one or more implementations of the present specification are merely used to describe specific implementations, and are not intended to limit the one or more implementations of the present specification. The terms "a" and "the" of singular forms used in one or more implementations of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in one or more implementations of the present specification to describe various types of information, the information is not limited to these terms. These terms are only used to differentiate between information of the same type. For example, without departing from the scope of one or more implementations of the present specification, first information can also be referred to as second information, and similarly, the second information can be referred to as the first information. Depending on the context, for example, the word "if" used here can be explained as "while", "when", or "in response to determining".

The previous descriptions are only example implementations of one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A computer-implemented method for obtaining a real-name electronic bill, comprising:
    storing, by a network node on a blockchain, a target electronic bill, wherein the target electronic bill comprises an identifier of the target electronic bill and identity information of a payment user in the target electronic bill;
    receiving, by a bill management terminal, an input of a user, wherein the input of the user comprises a first request to associate the user with the target electronic bill and the identifier of the target electronic bill;
    sending, by the bill management terminal and to the network node on the blockchain, a second request to associate the user with the target electronic bill stored in the blockchain, wherein the second request comprises the identifier of the target electronic bill;
    receiving, by the network node on the blockchain, the second request;
    in response to receiving the second request, searching, by the network node on the blockchain, for the target electronic bill in the blockchain based on the identifier of the target electronic bill comprised in the second request;
    determining, by the network node on the blockchain, that the target electronic bill stored in the blockchain is not associated with user identity information of the user;
    in response to determining that the target electronic bill stored in the blockchain is not associated with the user identity information of the user, sending, by the network node on the blockchain and to the bill management terminal, a third request for user information;
    in response to receiving the third request for user information, displaying, by the bill management terminal, a prompt for user identity information;
    collecting, by the bill management terminal, the user identity information of the user from user identity information collecting hardware of the bill management terminal, wherein the collecting the user identity information of the user comprises:
        activating, by the bill management terminal, the user identity information collecting hardware; and
        obtaining, by the bill management terminal via the prompt, the user identity information of the user by using the user identity information collecting hardware;
    sending, by the bill management terminal, the user identity information of the user to the network node on the blockchain;
    receiving, by the network node on the blockchain and from the bill management terminal, the user identity information of the user;
    verifying, by the network node on the blockchain, whether the user identity information of the user matches the identity information of the payment user in the target electronic bill;
    determining, by the network node on the blockchain, that the user identity information of the user matches the identity information of the payment user in the target electronic bill; and
    in response to determining that the user identity information of the user matches the identity information of the payment user in the target electronic bill, publishing, by the network node on the blockchain, the matched determination on the blockchain.

2. The computer-implemented method of claim 1, further comprising:

storing, by the network node on the blockchain, a correspondence between the user identity information of the user and one or more electronic bill identifiers;

receiving, by the bill management terminal, a second input of the user, wherein the second input of the user comprises a fourth request and the user identity information of the user;

sending, by the bill management terminal and to the network node on the blockchain, a fifth request, wherein the fifth request comprises the user identity information of the user;

receiving, by the network node on the blockchain, the fifth request; and in response to the fifth request, searching, by the network node on the blockchain, the correspondence stored in the blockchain between the user identity information of the user and the one or more electronic bill identifiers.

3. The computer-implemented method of claim 2, further comprising:

determining, by the network node on the blockchain, that the one or more electronic bill identifiers comprise the identifier of the target electronic bill corresponding to the user identity information of the user included in the fifth request; and sending, by the network node on the blockchain and to the bill management terminal, bill information of the target electronic bill.

4. The computer-implemented method of claim 1, wherein the verifying, by the network node on the blockchain, whether the user identity information of the user matches identity information of a payment user in the target electronic bill comprises:

invoking, by the network node on the blockchain, a smart contract; and verifying, by the network node on the blockchain via the smart contract, whether the user identity information of the user matches the identity information of the payment user in the target electronic bill.

5. The computer-implemented method of claim 1, wherein:

the user identity information of the user comprises a unique identifier of the user, the identity information of the payment user in the target electronic bill comprises a name of a payer of the target electronic bill, and the verifying, by the network node on the blockchain, whether the user identity information of the user matches identity information of a payment user in the target electronic bill comprises:

obtaining, by the network node on the blockchain via an oracle machine or an inter-blockchain relay, a name of the user corresponding to the unique identifier of the user from an off-chain server; and verifying whether the name of the user matches the name of the payer of the target electronic bill.

6. The computer-implemented method of claim 1, wherein:

the user identity information of the user comprises an identity card number of the user, and the user identity information collecting hardware comprises identity card scanning hardware, and the obtaining, by the bill management terminal, the user identity information of the user by using the user identity information collecting hardware comprises obtaining, by the bill management terminal, the identity card number of the user by scanning an identity card of the user using the identity card scanning hardware.

7. The computer-implemented method of claim 1, wherein:

the user identity information of the user comprises one or more of physiological characteristic information of the user, the user identity information collecting hardware comprises image collection hardware, and the obtaining, by the bill management terminal, the user identity information of the user by using the user identity information collecting hardware comprises obtaining, by the bill management terminal, a face image of the user using the image collection hardware.

8. The computer-implemented method of claim 1, wherein:

the user identity information of the user comprises one or more of physiological characteristic information of the user, the user identity information collecting hardware comprises audio collection hardware in the bill management terminal, and the obtaining, by the bill management terminal, the user identity information of the user by using the user identity information collecting hardware comprises obtaining, by the bill management terminal, sound information of the user using the audio collection hardware.

9. The computer-implemented method of claim 1, wherein:

the user identity information of the user comprises one or more of physiological characteristic information of the user, the user identity information collecting hardware comprises iris collection hardware, and the obtaining, by the bill management terminal, the user identity information of the user by using the user identity information collecting hardware comprises obtaining, by the bill management terminal, iris information of the user using the iris collection hardware.

10. The computer-implemented method of claim 1, wherein:

the user identity information of the user comprises one or more of physiological characteristic information of the user, the user identity information collecting hardware comprises fingerprint collection hardware deployed in the bill management terminal; and the obtaining, by the bill management terminal, the user identity information of the user by using the user identity information collecting hardware comprises obtaining, by the bill management terminal, fingerprint information of the user using the fingerprint collection hardware.

* * * * *